Feb. 11, 1969     E. B. NOLT     3,426,672
HAY BALER
Filed April 20, 1966     Sheet _1_ of 4
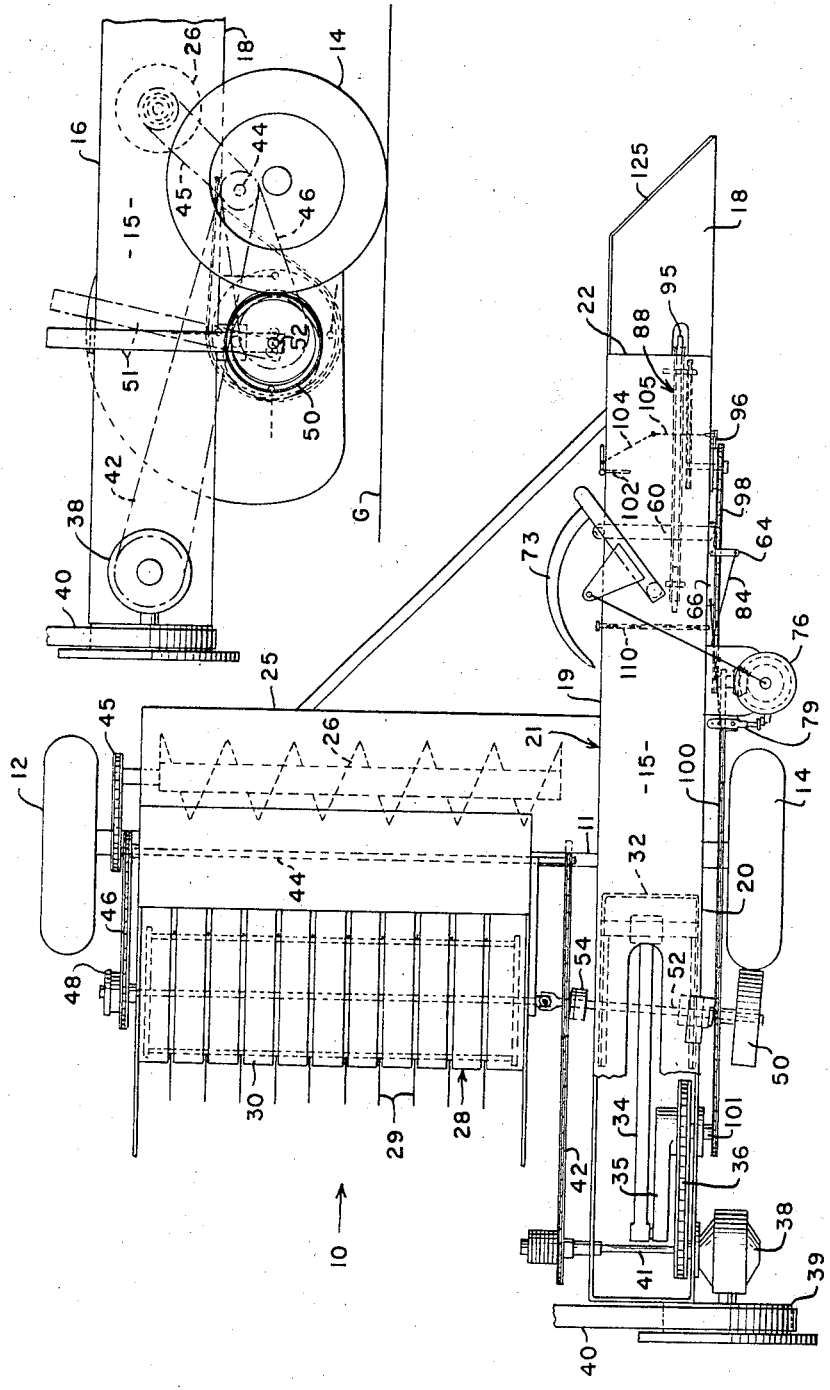
INVENTOR.
EDWIN B. NOLT
BY
*Joseph A. Brown*
ATTORNEY

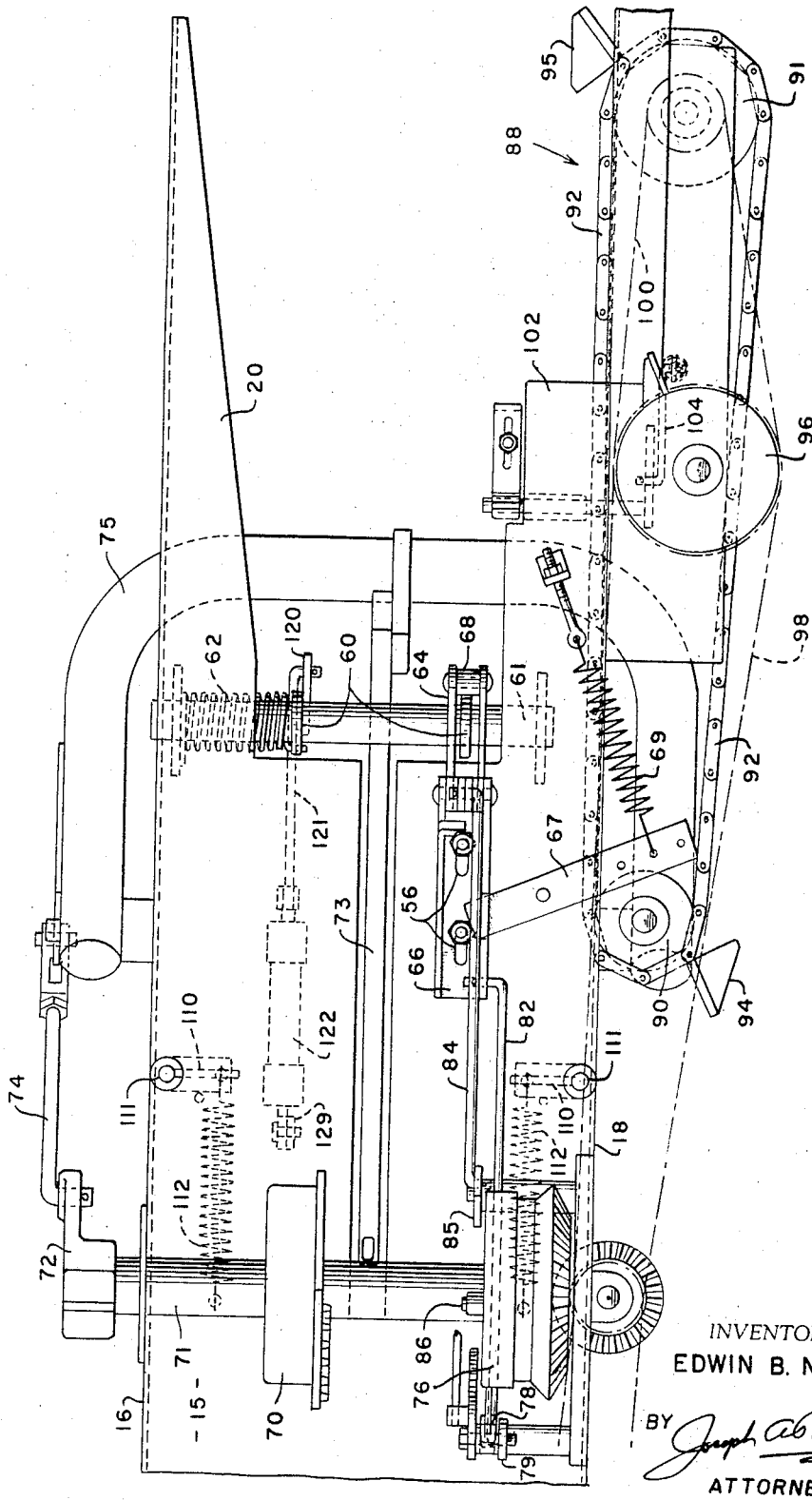

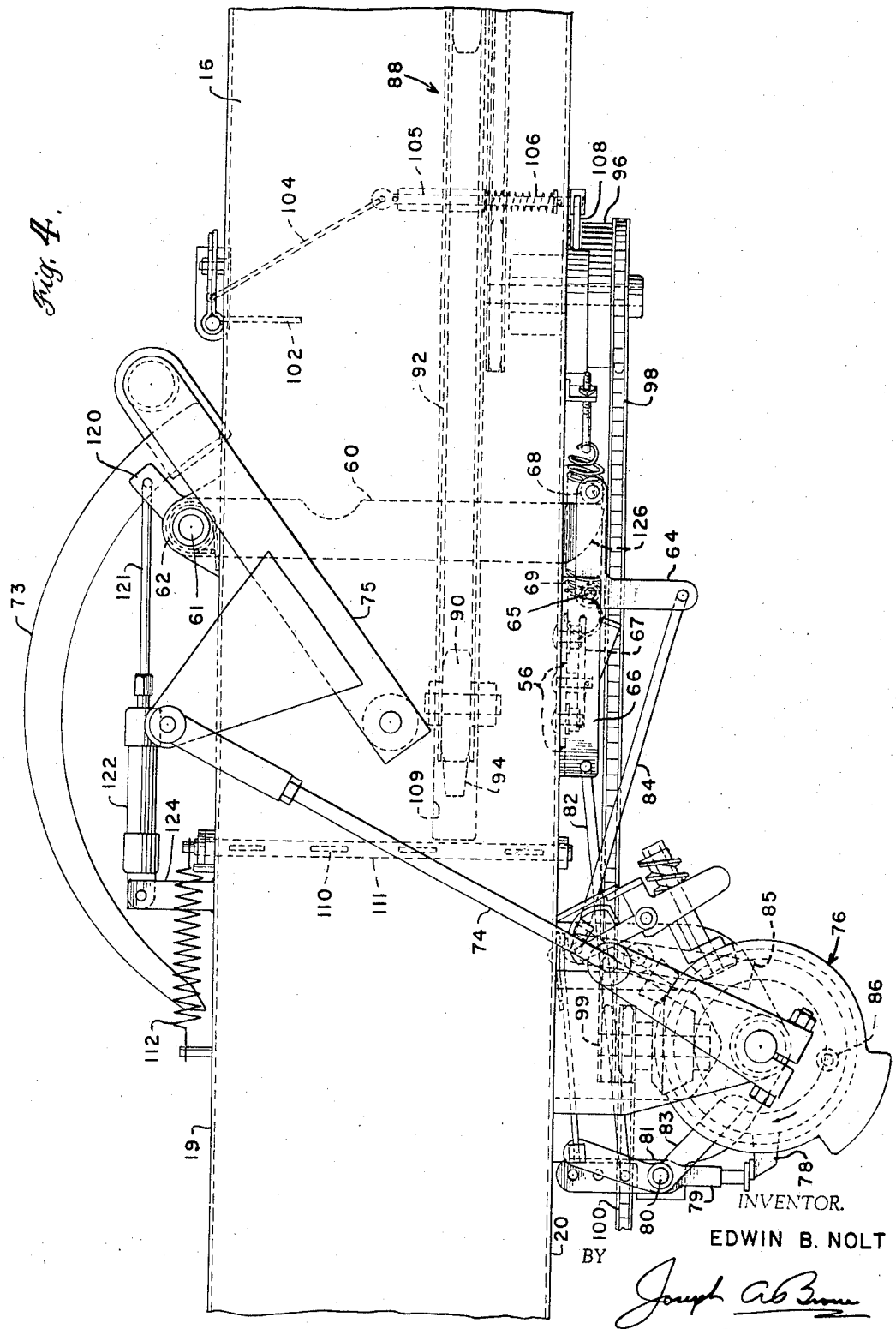

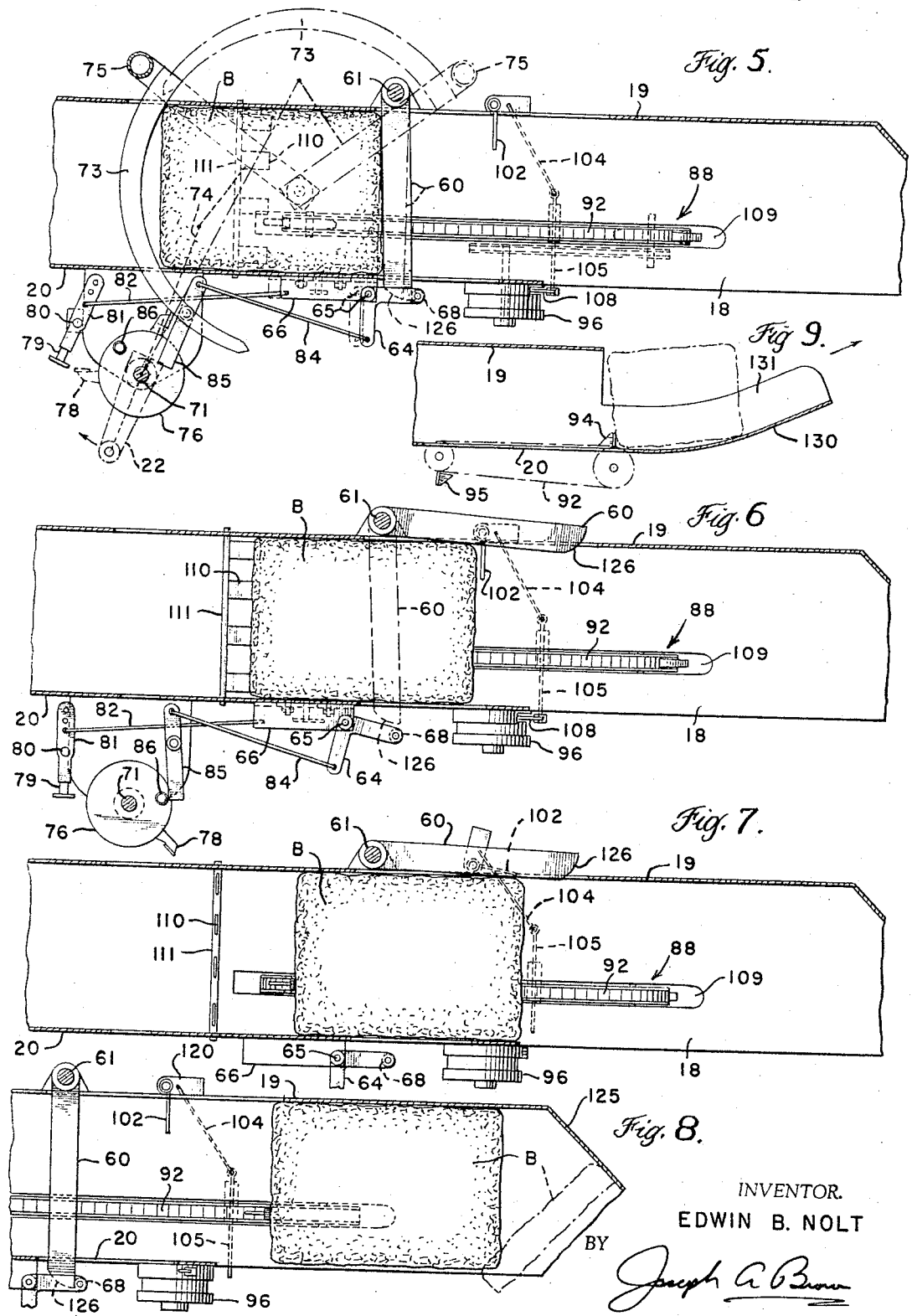

United States Patent Office 3,426,672
Patented Feb. 11, 1969

3,426,672
HAY BALER
Edwin B. Nolt, New Holland, Pa., assignor to Sperry Rand Corporation, New Holland, Pa., a corporation of Delaware
Filed Apr. 20, 1966, Ser. No. 543,845
U.S. Cl. 100—4     11 Claims
Int. Cl. A01f *15/14;* B65b *57/10*

ABSTRACT OF THE DISCLOSURE

A hay baler having a bale case, a gate projecting across the bale case intermediate the ends thereof and against which bales of fixed length are successively formed, the bales having a rectilinear travel from one end of the bale case to the other, means responsive to pressure of a bale against the gate for instituting the operation of a mechanism which bands and ties the bale, the gate being movable out of the bale case after the bale has been banded and tied, there being ejector means engageable with each completed bale to continue its rectilinear travel and traject it from the bale case, and actuator means being provided rearwardly of the gate in the path of bale movement and engaged by each completed bale to operate the ejector means.

---

This invention relates generally to hay balers and more particularly to hay balers adapted to form bales of fixed uniform length.

With the passage of time, the hay baler has become a highly developed piece of farm equipment. It is capable of producing bales at a rate of fifteen tons per hour or more. If these bales are manually loaded onto a wagon, it is a laborious task. Therefore, devices have been developed which will automatically load hay bales.

The most commonly used bale handling device is the bale thrower which will receive each completed bale from the baler and traject it to a trailing wagon. See Patent No. 3,132,754, issued May 12, 1964. With such a device, the bales are deposited in random fashion in a wagon. In such condition, the wagon is able to hold a lesser amount of bales than would be the case if the bales were uniformly stacked to completely fill the wagon body. However, substantially the same load is achieved and the labor factor in loading is eliminated.

Another device has been provided which will pick up bales, after they have been deposited on a field by a baler, and automatically stack them on a wagon. Such a device is shown in U.S. Patent No. 2,848,127 issued Aug. 19, 1958. In such a device, individual bales are oriented relative to other bales and stacked in tiers which are then disposed one against the other to form a complete wagon load. Subsequently, the entire wagon load is discharged in a suitable location where the bales are to be piled.

Whether bales are to be trajected by a bale thrower or stacked by an automatic stacking mechanism, the mechanism will operate more efficiently and effectively if all of the bales handled are of uniform or fixed length. This is particularly true of bale stacking devices.

A major object of this invention is to provide a hay baler which will produce hay bales of fixed length and thus render these bales particularly suitable for automatic stacking and handling.

Another object of this invention is to provide a hay baler which will operate continuously with a capacity similar to present hay balers but nevertheless produce bales of uniform length.

Another object of this invention is to provide a hay baler in which bales are banded and tied responsive to the formation of a bale of a given length, the bale thereafter being positively ejected from the baler.

A further object of this invention is to provide a hay baler of the character described in which the means which ejects a completed bale from the bale case of the baler and the means which may be used to traject it to a trailing wagon are one and the same.

A still further object of this invention is to provide a hay baler of the character described in which the operative components are relatively simply constructed whereby the baler may be manufactured at a cost commensurate with present balers.

Other objects of this invention will be aparent hereinafter from the specification and from the recital in the appended claims.

In the drawings:

FIG. 1 is a plan view of a hay baler constructed according to this invention;

FIG. 2 is an enlarged fragmentary side elevational view of the front portion of the baler and showing the pickup and the drive therefor;

FIG. 3 is an enlarged side elevational view of the fixed length operating mechanism of the baler and showing also the bale ejector means of the baler;

FIG. 4 is a plan view of FIG. 3;

FIGS. 5–8 are diagrammatic views illustrating the operation of the fixed bale length forming mechanism of the baler and the ejector means; and FIG. 9 illustrates a modified form of the bale ejector operative structure.

Referring now to the drawings by numerals of reference, and first to FIGS. 1 and 2, 10 denotes generally a hay baler having a frame 11 supported by ground wheels 12 and 14. Baler 10 has a bale case 15 which is rectangular in cross-section, having a top wall 16, a bottom wall 18, and side walls 19 and 20. Bale case 15 extends in a fore-and-aft direction relative to travel of the baler on ground G. The bale case has a forward inlet opening indicated at 21 in FIG. 1 and a discharge outlet 22 at the rearward end.

Mounted on frame 11 and extending transversely relative to bale case 15 is a feeder housing 25 in which an auger 26 is rotatable. Housing 25 is opened in a forward direction and communicates with a pickup 28 having rake tines 29 which operate to sweep hay off the ground and deliver it upwardly and rearwardly over stripper members 30 for delivery to infeed auger 26. The auger then operates to convey the hay laterally through infeed opening 21 and into bale case 15.

Reciprocable in the bale case is a plunger 32, shown in a retracted position in FIG. 1. Plunger 32 has a connecting rod 34 driven by a crank arm 35 rotated by a chain 36 from a gearbox 38. The gearbox is mounted on the front end of bale case 15 and it receives power from a flywheel 39 around which a belt 40 extends and driven from a source of power not shown. As crank 35 rotates, plunger 32 reciprocates from the position shown in FIG. 1 to a position rearwardly of the inlet opening 21.

Gearbox 38 has a cross-shaft 41 which transmits power to a fore-and-aft extending drive chain 42 which rotates a lay shaft 44 rearwardlly of pickup 28, beneath housing 25, and extending transversely thereof. The outboard end of shaft 44 is connected to a chain 45 which drives infeed auger 26.

Lay shaft 44 also has a chain 46 connected to the pickup through an overrunning clutch 48. However, normally the pickup is driven by a friction connection to ground wheel 14. As shown in FIGS. 1 and 2, bale case 15 supports a driven wheel 50 movable into and out of engagement with the periphery of ground wheel 14 by means of a handle 51. Wheel 50 operates through a shaft 52 and overrunning clutch 54 to drive the inboard end of the pickup. In the operation of the baler, if the operator makes a left hand turn, the wheel 14 pivots and does not rotate. In such case, the pickup continues to operate, being driven by lay shaft 44 until the turn has been completed and ground wheel 14 again begins to turn and drive the pickup. With this particular arrangement, the pickup is driven by a friction drive from the ground wheel; but an auxiliary drive is provided to keep the pickup operating during the making of a left hand turn.

As the plunger 32 reciprocates, it forces successive wads of hay rearwardly through the bale case 15. These wads of hay successively build up to form hay bales and each bale is moved rectilinearly through the bale case and toward outlet 22. In order that all of the bales may have substantially the same fixed length, a gate 60 is provided which normally projects across the bale case and in the path of each bale as it is formed. Gate 60, shown best in FIGS. 3 and 4, comprises bars pivotally supported on pin 61 carried on bale case side wall 19. In FIGS. 1, 3, 4–6 and 8, gate 60 is in a normal first position across bale case 15. In FIGS. 6 and 7 the gate is shown in a second retracted position. A torsion spring 62 is provided which constantly urges the gate to pivot in a clockwise direction towards its normal position.

The engagement of a bale B with gate 60 is unable to pivot the gate toward the position shown in FIG. 6 because the gate is held by a detent 64 in the form of a bell crank pivotally supported at 65 on a plate 66 mounted on side wall 20 of the bale case for longitudinal sliding movement relative thereto. See FIG. 3. Plate 66 is adapted to slide longitudinally relative to the bale case within limits of slots 56. The bell crank has a roller 68 at one end which engages the free end of gate 60 and holds the gate in the position across the bale case. A tension spring 69 operates through pivoted arm 67 to urge bell crank detent 64 and slider 66 to a normal forward retracted position on the bale case.

Mounted on side wall 20 of the bale case is a conventional knotter mechanism illustrated generally at 70. This mechanism includes a timer shaft 71, which when rotated operates through links 72 and 74 to pivot a yoke 75 carrying needle means 73 for projecting a tying medium across bale case 15. The projection of needle means 73 from the solid position shown in FIG. 4 to the projected position shown in FIG. 5 is accomplished through one revolution of shaft 71, as is conventional. The operation of the timer shaft and the knotter is achieved through a one revolution of clutch 76 shown best in FIGS. 3 and 4. Clutch 76 is of conventional construction and has a dog 78 which is biased towards operative position but held in inoperative position by a clutch trip arm 79 pivotally supported at 80 on a bracket 81 projecting from bale case side wall 20. The clutch trip arm 79 is connected by a control rod 82 to slider plate 66. Further, a link 84 is connected to detent bell crank 64 and to a pivoted lever 85 having one end projecting in the path of a pin 86 carried on clutch 76. A clutch trip arm reset bell crank is shown at 83 and operative responsive to rotation of clutch 76.

The operation of this complete mechanism will be subsequently described.

Mounted on bottom wall 18 of bale case 15 is an ejector 88 having a pair of sprockets 90 and 91 over which an endless chain 92 extends. Chain 92 has a pair of lugs 94 and 95 a hundred and eighty degrees apart, as shown in FIG. 3. One of the lugs 94 is located forwardly and the other 95 rearwardly. There is a drive to rearward sprocket 91 through a clutch 96 and through a drive chain 98 which extends forwardly along the outside of bale case side wall 20 to a shaft 99 drivingly connected to a chain 100 which extends further along the forward end of the bale case to a shaft 101 coaxial with the axis of rotation of the bell crank 35. Chains 98 and 100 rotate continuously. However, the chain 92 of ejector 88 operates only when clutch 96 is engaged.

Clutch 96 is actuated by an arm 102 which normally projects into bale case 15 and into the path of a completed bale. It is pivotally supported on side wall 19 of the bale case. Arm 102 is connected by a link 104 to a clutch trip pin 105 spring loaded by spring 106 to normally hold dog 108 of clutch 96 in disengaged position. When the arm 102 is pivoted, pin 105 is retracted and dog 108 is released to actuate clutch 96.

The chain 92 and the lugs 94 and 95 thereon constitute a bale ejector which operates through a slot 109 in the bottom wall 18 of bale case 15. When operatively engaged with a bale and trajecting it rearwardly, a lug projects upwardly through the slot and into the bale within the bale case. When the lug 94 travels from the position shown in FIG. 3 to the position of the lug 95, it engages a bale and, in its horizontal travel rearwardly, exerts a trajecting force to the bale. In each operation, chain 92 travels one hundred and eighty degrees and the lugs 94 and 95 exchange positions.

To prevent forward expansion of each bale when it is completed in the baler, hay dogs 111 are provided on pivot shafts on the walls 16 and 18 of the bale case. The dogs normally project downwardly from top wall 16 and upwardly from bottom wall 18. They are spring biased towards these positions by springs 112, FIG. 4. The dogs normally project a few inches into the bale case and pivot to a flat inoperative position pressed against the bale case when a bale is moving past. However, once the bale is beyond the dogs, the springs become effective to move the dogs behind the bale and prevent springing of the bale forwardly.

One other detail of the fixed bale length forming structure, as shown in FIG. 4, is the dashpot 122. The dashpot has a rod 121 which connects to a tab 120 on gate 60. The opposite end of the dashpot is connected to a bracket 124 affixed to bale case wall 19. The dashpot operates to cushion the return movement of gate 60 after it has been moved from the bale case and then snaps back to normal position under the action of spring 62.

In operation, windrowed hay is picked up by the pickup 28 and delivered rearwardly to auger 26. The auger conveys the hay transversely through inlet opening 21 and into bale case 15. Reciprocating plunger 32 compresses the hay and forms it into hay bales. Each bale as it is formed moves progressively rearwardly toward gate 60 latched across the bale case by detent 64. Gate 60 is engaged by the formed bale as shown in FIG. 5. When the pressure of the bale against the gate is great enough to exceed the holding force of the spring 62, gate 60 pivots slightly from the solid to the dotted position in FIG. 5 and this causes slide plate 66 to shift rearwardly against spring 69. The shifting of plate 66 pulls rod 82 thereby causing the clutch trip arm 79 to pivot. The clutch trip arm pivots from the position shown in FIG. 4 to the position shown in FIG. 5. In such location, clutch dog 78 is released and the rotatable components of clutch 76 rotate one revolution. As timer shaft 71 rotates, it operates through links 72 and 74 to pivot needle yoke 75 and project needle means 73 across the bale case to the position shown in solid lines in FIG. 5. Twine is projected to knotter 70 to complete the banding and tying of the bale. The operation of the needle means and knotter is conventional.

During the rotation of the clutch 76, roller 86 engages lever 85 and causes it to pivot. This pulls link 84 and causes detent bell crank 64 to pivot clockwise as shown in comparing FIGS. 5 and 6. When the bell crank pivots, gate 60 is released and when the next wad of hay is delivered by plunger 32, the bale B moves further rearwardly. The engagement of the bale with gate 60 causes the gate to pivot outwardly of the bale case to the position shown in FIG. 6. In its pivoting movement out of the bale case, the torsion spring 62 is loaded thereby urging the gate back toward its normal position.

When the completed bale is in the position shown in FIG. 6, it is prevented from expanding forwardly by the bale holding dogs 110 on the pivot shafts 111. At the same time the rearward movement of the completed bale brings it into engagement with the actuator 102 of the bale ejector 88. When actuator 102 is pivoted from the position shown in FIG. 6 to the position shown in FIG. 7, clutch trip pin 105 is retracted and clutch 96 of the ejector is actuated. Then, chain 92 is driven one hundred and eighty degrees. The lug 94 is projected up through the slot 109 in the bottom 18 of the bale case and into engagement with the completed bale. In its travel from the sprocket 90 to the sprocket 91, lug 94 imparts a velocity to the bale and causes it to be trajected from the bale case and through discharge outlet 22. As shown in FIG. 8, an angularly disposed vertical side plate 125 may be provided on the bale case so that each bale will be tipped laterally as it is discharged rearwardly. In the operation of the ejector, the lug 94 moves at high speed to the position vacated by lug 95 and lug 95 moves to the position formerly occupied by the lug 94. As soon as the bale leaves actuator 102, spring 106 on clutch trip pin 105 causes the pin to return to its normal position and stops the clutch. At the same time, actuator 102 is returned to its position projecting into the bale case, FIG. 5.

Further, after the bale B has been ejected from the bale case, the torsion spring 62 operates to rapidly return gate 60 to its normal position. Dashpot 122 cushions this return. As the gate swings in a clockwise direction from the position shown in FIGS. 6 and 7 to the position shown in FIG. 8, its curved cam end 126 engages the roller 68 to pivot the bell crank against spring 69. As soon as the gate is in its normal position, the bell crank is returned to its holding position by spring 69 with the roller in engagement with the rearward edge of gate 60. In such position, the parts are disposed for the next operation of the device. Further, spring 69 operates to move slider plate 66 back to its normal position to reset clutch trip arm 79 for the next operation of clutch 76.

With the structure described, bales of substantially fixed length are formed in bale case 15. The bales may vary somewhat in density. However, bale lengths will be substantially uniform. Therefore, bale stacking apparatus may be designed and operative to handle bales of uniform length thereby producing desired bale stacking results and more effective operation.

In addition to ejecting bales from the bale case, the ejector may be used to traject bales to a trailing wagon by the simple modification of the bale case as shown in FIG. 9. In such arrangement, the angular side plate 25 at the rear end of the bale case is removed and instead an upwardly curved bottom plate is provided with side walls 131. The velocity imparted to each bale by the particular driving lug of ejector 88 causes the bale to be trajected in an upward rearward direction for deposit in a trailing wagon.

Having thus described my invention, what I claim is:

1. A hay baler for forming bales of substantially uniform length comprising an elongated bale case which extends in a fore-and-aft direction relative to travel of the baler, said bale case having a forward inlet through which hay is fed and a rearward outlet through which completed bales are discharged, a reciprocable plunger in said bale case for compressing hay into bales, each bale moving progressively rearwardly from said inlet and toward said outlet as it is formed, a bale length control gate supported on said bale case for movement from a normal first position extending across the bale case and a retracted second position along side the bale case, a releaseable detent holding said gate in said first position, means for banding and tying each completed bale, means operating said banding and tying means and for releasing said detent responsive to bale pressure against said gate, each bale after it is tied being forced by the next bale toward said bale case outlet, said gate moving from said first to said second position by the tied bale after said detent is released, ejector means engageable with the tied bale when it reaches a given position in said bale case and forceably discharging it rearwardly through said outlet, actuator means rearwardly of said gate in the path of bale movement and engageable by each bale to operate said ejector means, and means for resetting said gate in said normal first position and held by said detent after the tied bale has been ejected.

2. A hay baler as recited in claim 1 wherein said gate is pivotally mounted on said bale case and spring loaded to move from said second and toward said first position.

3. A hay baler as recited in claim 2 wherein a dashpot is provided to cushion the movement of said gate from said second to said first position.

4. A hay baler as recited in claim 1 wherein said detent is mounted for both sliding longitudinal movement on said bale case and pivotal movement relative thereto.

5. A hay baler as recited in claim 4 wherein means is provided for triggering said banding and tying operating means responsive to said sliding movement of said detent.

6. A hay baler as recited in claim 5 wherein means is provided for pivoting said detent responsive to operation of said banding and tying means.

7. A hay baler as recited in claim 6 wherein said detent is spring loaded in a given position on said bale case from which it slides and pivots, said detent and said gate being so positioned relative to each other that the gate engages the detent and cause it to pivot when the gate returns from said second to said first position.

8. A hay baler as recited in claim 1 wherein bale holding dogs are mounted on said bale case forwardly of said gate to retard forward movement of each bale when said plunger is retracted.

9. A hay baler as recited in claim 1 wherein said bale ejector comprises a lug projectable into each tied bale, and means for moving said lug at high speed from a location where it first engages a bale to a location rearwardly thereof where the lug disengages from the bale whereby the bale is trajected rearwardly from the baler.

10. A hay baler as recited in claim 9 wherein said bale case has a bale chute, inclined upwardly from said outlet, and wherein said ejector is operable to move a bale along said chute for discharge in an upward rearward trajectory.

11. In a hay baler, the combination of a bale case having a forward inlet and a longitudinal rearward outlet, a plunger reciprocable in said bale case for forming hay delivered through said inlet into a bale, a gate projecting across said bale case in the path of said bale to resist rectilinear longitudinal movement thereof toward said outlet, means for banding and tying said bale responsive to pressure of the bale against said gate exceeding a given amount, means for releasing said gate for movement out of the path of said bale responsive to operation of said banding and tying means, ejector means engageable with the completed bale to continue its rectilinear travel through said bale case and traject it longitudinally rearwardly through said outlet, and actuator means rearwardly of said gate in the path of bale movement and engaged by each bale to operate said ejector means.

References Cited

UNITED STATES PATENTS

| | | | |
|---|---|---|---|
| 2,593,569 | 4/1952 | Kelley | 100—250 X |
| 2,775,930 | 1/1957 | Anderson et al. | 100—250 X |
| 3,045,583 | 7/1962 | Davin | 100—4 |
| 3,099,205 | 7/1963 | Lovrinch | 100—255 |
| 3,198,106 | 8/1965 | Skromme | 100—188 |
| 3,279,356 | 10/1966 | Raab | 100—45 |

FOREIGN PATENTS 562,238  8/1923  France.

BILLY J. WILHITE, *Primary Examiner.*

U.S. Cl. X.R.

100—250, 45, 7